United States Patent
Cheung

(10) Patent No.: US 7,150,666 B2
(45) Date of Patent: Dec. 19, 2006

(54) MULTI-LAYERED SPORTS BOARD

(75) Inventor: Wah Kan Cheung, Richmond Hill (CA)

(73) Assignee: Bamba International (Canada) Ltd., Richmond Hill (CA)

(*) Notice: Subject to any disclaimer, the term of this patent is extended or adjusted under 35 U.S.C. 154(b) by 0 days.

(21) Appl. No.: 10/797,995

(22) Filed: Mar. 11, 2004

(65) Prior Publication Data

US 2005/0202737 A1  Sep. 15, 2005

(51) Int. Cl.
*A63C 5/03* (2006.01)

(52) U.S. Cl. .......................... 441/74; 114/357

(58) Field of Classification Search ............. 441/65, 441/68, 74; 428/316.6, 308.4, 318.6, 319.3, 428/319.9, 319.7; 114/357
See application file for complete search history.

(56) References Cited

U.S. PATENT DOCUMENTS

| | | | |
|---|---|---|---|
| 4,850,913 A | 7/1989 | Szabad, Jr. | |
| 5,211,593 A * | 5/1993 | Schneider et al. | 441/65 |
| 5,275,860 A | 1/1994 | D'Luzansky et al. | |
| 5,503,921 A | 4/1996 | Chang et al. | |
| 5,647,784 A | 7/1997 | Moran | |
| 5,658,179 A | 8/1997 | Glydon et al. | |
| 5,882,776 A * | 3/1999 | Bambara et al. | 428/215 |
| 6,221,451 B1 * | 4/2001 | Lauer et al. | 428/36.5 |
| 6,492,013 B1 * | 12/2002 | Ramesh | 428/308.4 |
| 6,773,798 B1 | 8/2004 | Ramesh | |
| 2002/0121765 A1 | 9/2002 | Wolf | |
| 2002/0167136 A1 | 11/2002 | Lehr et al. | |

* cited by examiner

*Primary Examiner*—Ed Swinehart
(74) *Attorney, Agent, or Firm*—Phillips Lytle LLP

(57) ABSTRACT

Sports board (15) comprising an elongated expanded closed-cell polyolefin foam core (16) having a core thickness and opposed surfaces (18, 19), a first polyolefin sheet layer (23) having a thickness less than the core thickness and having an inner surface (25) and an outer surface (24), an intermediate metallocene-based polyolefin layer (20) having an inner surface (22) and an outer surface (21) and a thickness less than the core thickness, the intermediate layer bonded on its inner surface to the core and bonded on its outer surface to the inner surface of the first layer. The intermediate layer may comprise an ethylene-alpha olefin copolymer and may comprise a copolymer of ethylene and octene.

2 Claims, 6 Drawing Sheets

MULTI-LAYERED SPORTS BOARD

TECHNICAL FIELD

The present invention relates to foam sports boards for recreational use and, more particularly, to a laminated board with improved bonding characteristics.

BACKGROUND ART

Body boards for riding waves and other recreational sports boards made of foam or other floatation material are known in the prior art. In general, such sports boards are composed of a number of layers thermally or adhesively bonded together. The boards generally have a closed-cell foam core covered by one or more layers adhesively or thermally bonded to the core.

A number of laminated boards are known in the prior art and a number of methods of laminating or bonding the various layers of the board together are known. Examples of such boards and methods of laminating them are shown and disclosed in U.S. Pat. Nos. 5,211,593, 5,658,179, 5,503,921, 4,850,913 and 5,275,860. In bonding the layers together it is desirable to provide a bond between two layers which is stronger than the strength of the layers themselves.

Boards and methods of manufacturing them known in the prior art have a number of deficiencies. It is also known in the prior art that an adhesive may be used to bond the various layers together. This method of bonding has a number of drawbacks, including the adverse affect of solvent vapors released into the air during the manufacturing process and the added weight to the board of an adhesive joint. In addition, many conventional adhesives eventually deteriorate from the adverse affect of salt water on the adhesive over time, causing delamination.

It is also known that heat may be used to bond the various layers together. However, boards known in the prior art generally require that the thermal laminating process by which they are made occur at very high and exact temperatures in order to properly bond the layers. The requirement for a high and exact bonding temperature necessitates a more elaborate laminating process and can cause undesirable shrinkage of the layers. This type of bonding is especially difficult when the layers are of different materials having different characteristics.

Accordingly, there is a need for a thermally laminated foam board with improved bonding between layers of different polymeric materials having different thermal characteristics.

DISCLOSURE OF THE INVENTION

With parenthetical reference to the corresponding parts, portions or surfaces of the disclosed embodiment, merely for the purposes of illustration and not by way of limitation, the present invention provides an improved sports board (15) comprising an elongated expanded closed-cell polyolefin foam core (16) having a core thickness and opposed surfaces (18, 19), a first polyolefin sheet layer (23) having a thickness less than the core thickness and having an inner surface (25) and an outer surface (24), an intermediate metallocene-based polyolefin layer (20) having an inner surface (22) and an outer surface (21) and a thickness less than the core thickness, the intermediate layer bonded on its inner surface to the core and bonded on its outer surface to the inner surface of the first layer. The intermediate layer may comprise an ethylene-alpha olefin copolymer and may comprise a copolymer of ethylene and octene. The core may comprise polyethylene, polypropylene, or both polyethylene and polypropylene. The first layer may comprise polyethylene film, polypropylene film, both polyethylene and polypropylene, or polyethylene film and ethylene vinyl acetate. The intermediate layer may be thermally bonded to the core and the first layer. The board may further comprise a graphically imprinted layer (26) bonded to the outer surface of the first layer.

Accordingly, the general object of the present invention is to provide an improved sports board with foam tear strength bonds.

Another object is to provide an improved sports board in which different polyolefin materials may be used in the layers without a derogation in bonding strength.

Another object is to provide an improved sports board which permits the layers to be laminated together at lower and less exact temperature ranges.

Another object is to provide an improved sports board which may be manufactured using conventional means with improved bond strength and flexibility along the bond line between the laminates.

Another object is to provide an improved sports board which has a smooth surface.

Another object is to provide an improved sports board which is manufacturable without deleterious foam shrinkage.

DESCRIPTION OF THE PREFERRED EMBODIMENTS

Figure 1:
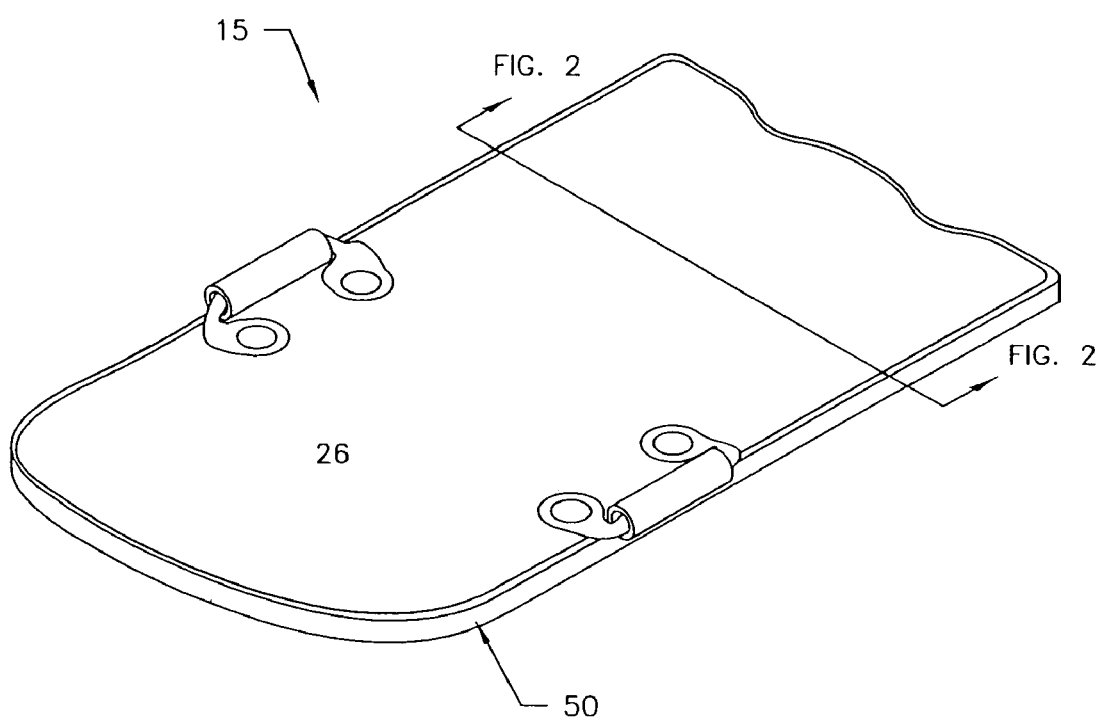
FIG. 1 is a perspective view of a first embodiment of the sports board.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
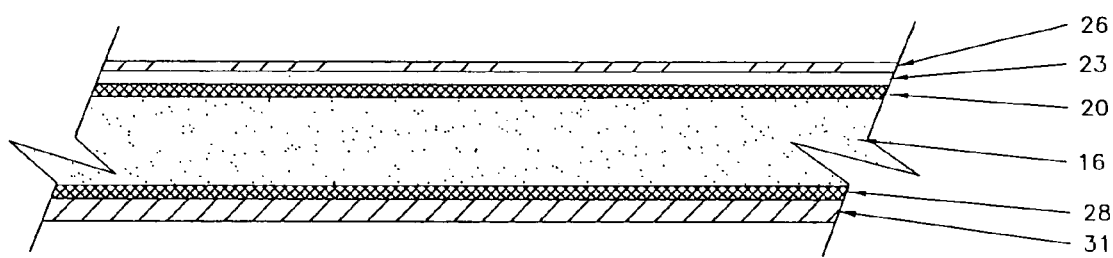
FIG. 2 is a partial vertical sectional view of the sports board shown in FIG. 1, taken generally on line 2—2 of FIG. 1.
Figure 3:
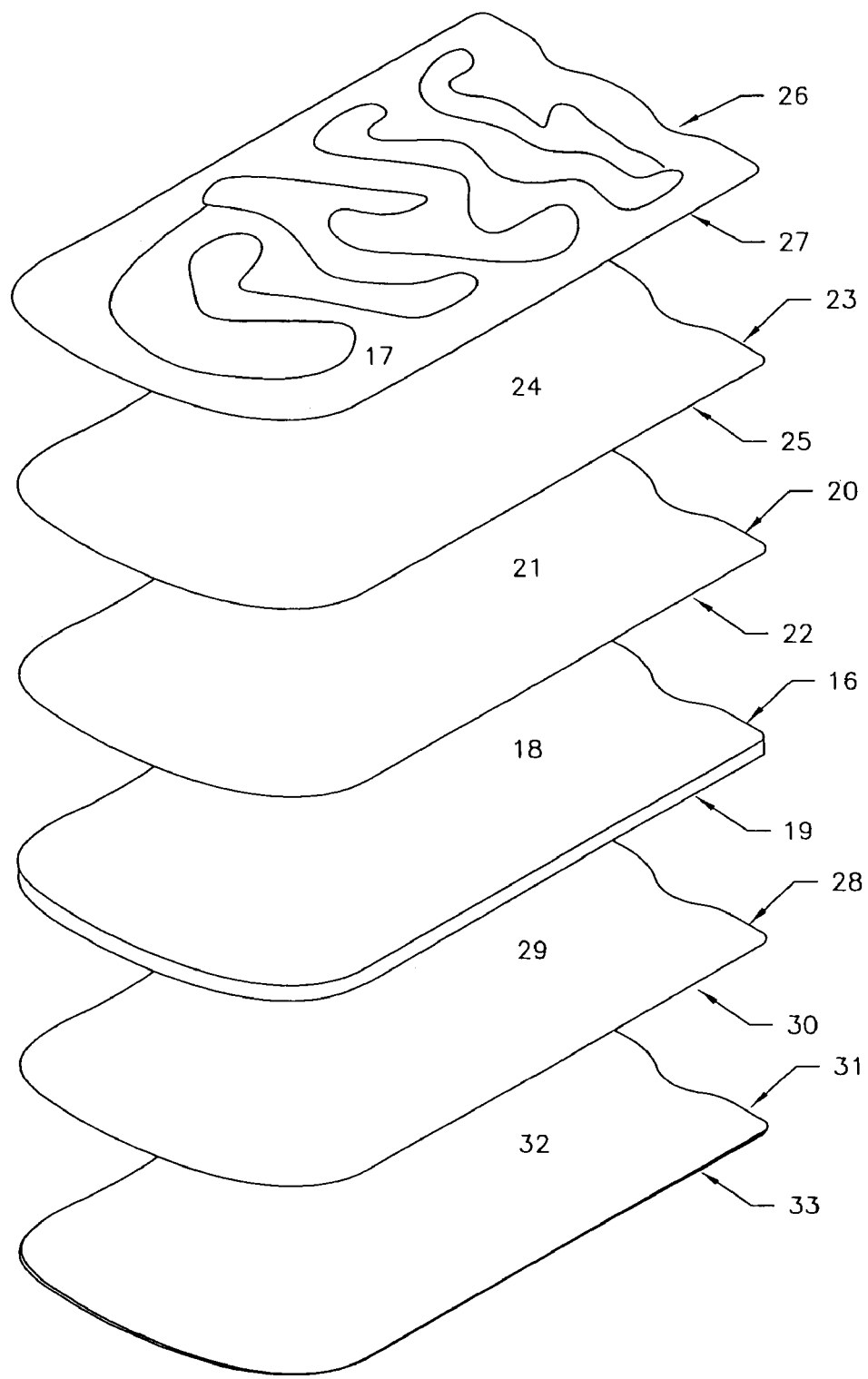
FIG. 3 is an exploded view of the sports board shown in FIG. 1.

Referring now to the drawings and, more particularly, to FIG. 1 thereof, this invention provides an improved sports board, the presently preferred embodiment of which is generally indicated at 15. As shown in FIGS. 1–3, sports board 15 is comprised of six layers laminated together.

Top layer 26 is graphically imprinted polyethylene film. The graphics on layer 26 are imprinted using any of several conventional processes for printing on polyethylene. An example of such a process is corona printing, in which an electrical discharge temporarily alters the surface molecules of the polyethylene film, allowing inks to adhere to the film. Layer 26 has a thickness of between 0.5 and 4 mils, and preferably a thickness of 1 mil. Layer 26 has a density in the range of 0.942 to 0.962 g/cm$^3$, and preferably a density of 0.952 g/cm$^3$. Layer 26 is heat laminated to the outer surface 24 of layer 23.

Layer 23 is a blend of low density polyethylene and ethylene vinyl acetate. Layer 23 comprises about 1 to 25% by weight ethylene vinyl acetate, with the remaining portion being made up of low density polyethylene. Layer 23 has a thickness of between 10 and 60 mils, and preferably a thickness of 20 mils. Layer 23 has a density of between 0.912 and 0.932 g/cm$^3$, and preferably a density of 0.922 g/cm$^3$. The inner surface 25 of layer 23 is laminated to the outer surface 21 of layer 20.

Layer 20 is metallocene-catalyzed polyolefin. In the preferred embodiment, layer 20 is an ethylene-olefin copolymer of ethylene and octene produced in a conventional solution polymerization process using a metallocene catalyst. Metallocene is used as an olefin polymerization catalyst to form a metallocene-based copolymer. Layer 20 has a thickness between 0.5 and 12 mils, and preferably a thickness of 1 mil. Layer 20 has a preferred density of 0.882 g/cm$^3$. Inner surface 22 of layer 20 is laminated to outer surface 18 of layer 16.

Layer 16 is closed-cell polyethylene foam, and acts as the core of board 15. Core 16 may be beaded type, extruded type or cross-linked polyethylene foam. Core 16 has a thickness of between ⅛ and 2 inches, and preferably a thickness of 1 inch. Core 16 has a density of between 1.6 and 4 lb/ft$^3$, and preferably a density of 2.2 lb/ft$^3$. It is contemplated that foam core 16 may be formed from two ½ inch layers laminated together to form a 1 inch thick foam core. The outer surface 19 of layer 16 is in turn laminated to the inner surface 29 of layer 28.

Layer 28 is of the same structure and composition as layer 20. The outer surface 30 of layer 28 is laminated to the inner surface 32 of layer 31. This intermediate layer provides a superior bond between polyethylene foam and polyethylene film.

Layer 31 is polyethylene film. Layer 31 has a thickness between 8 to 60 mils, and preferably a thickness of 30 mils. Layer 31 has a density of between 0.942 and 0.962 g/cm$^3$, and preferably a density of 0.952 g/cm$^3$.

Both layers 31 and 26 are high density polyethylene film. The bottom surface 33 of layer 31 provides the bottom surface for board 15. Top surface 17 of layer 26 provides the top surface of board 15.

Sports board 15 is formed in a series of steps. First, layers 28 and 31 are co-extruded to form a bottom laminated skin, using a conventional co-extrusion process, and are cut to the desired length. The co-extruded layers 31 and 28 are then heat laminated to the bottom surface 19 of core 16 using a conventional heat laminating process with rollers, forming a laminated sheet of layers 16, 28 and 31.

Layer 26 is imprinted with the desired graphics using a conventional imprinting procedure. Layer 26 is then fed from a roll and heat laminated with rollers to the top surface 24 of layer 23 as layers 23 and 20 are co-extruded, using a conventional co-extrusion process, thereby forming a laminated sheet of layers 26, 23 and 20. The sheet of laminated layers 26, 23 and 20 is then heat laminated to the top surface 18 of core 16. The resulting laminated board, consisting of layers 26, 23, 20, 16, 28 and 31, is then die cut to a desired shape. The side edges of the board are then shaped to the desired configuration and slope. Finally, a polyethylene foam strip 50 is heat laminated to cover the shaped side edges of laminated layers 26, 23, 20, 16, 28 and 31 of snow sled 15 and excess material is cut free.

Figure 4:
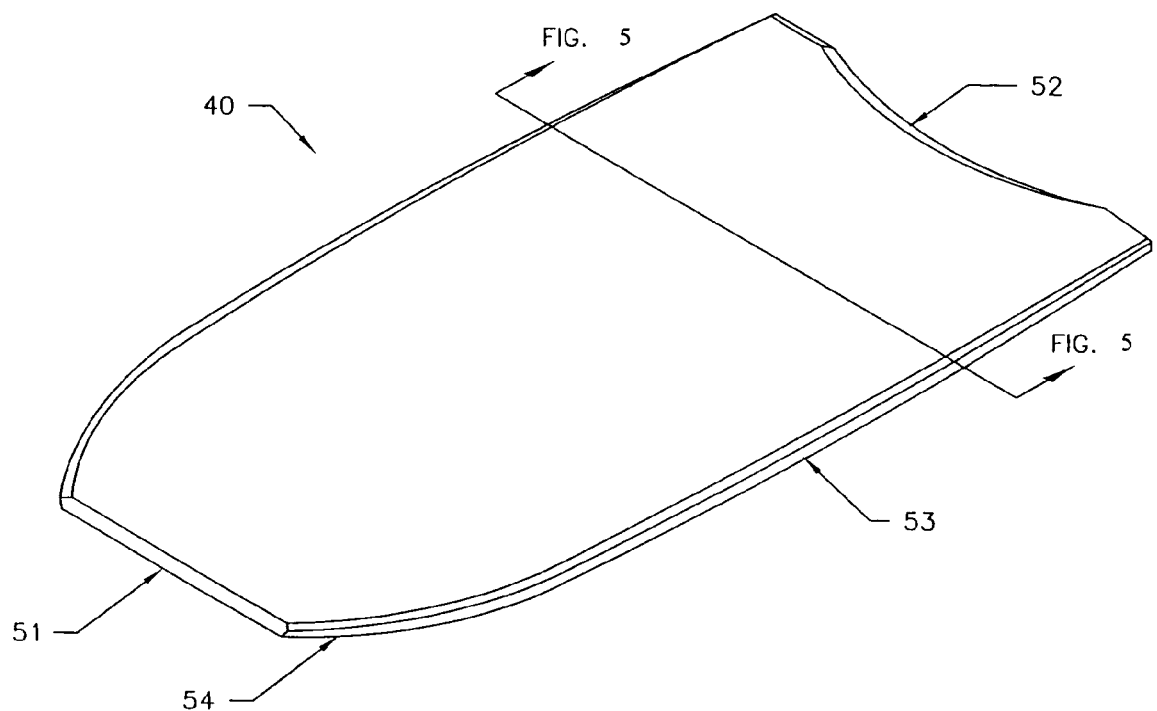
FIG. 4 is a perspective view of a second embodiment of the sports board.
Figure 5:
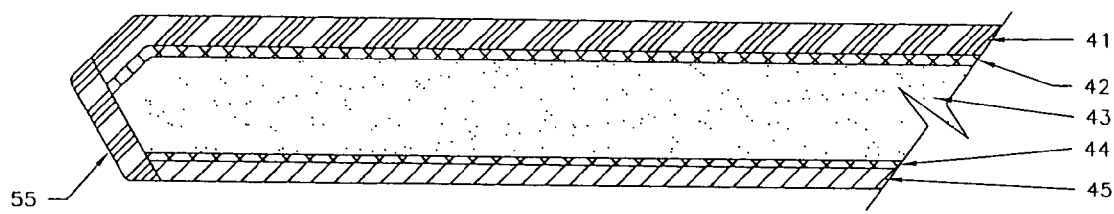
FIG. 5 is a vertical sectional view, of the sports board shown in FIG. 4, taken generally on line 5—5 of FIG. 4.
Figure 6:
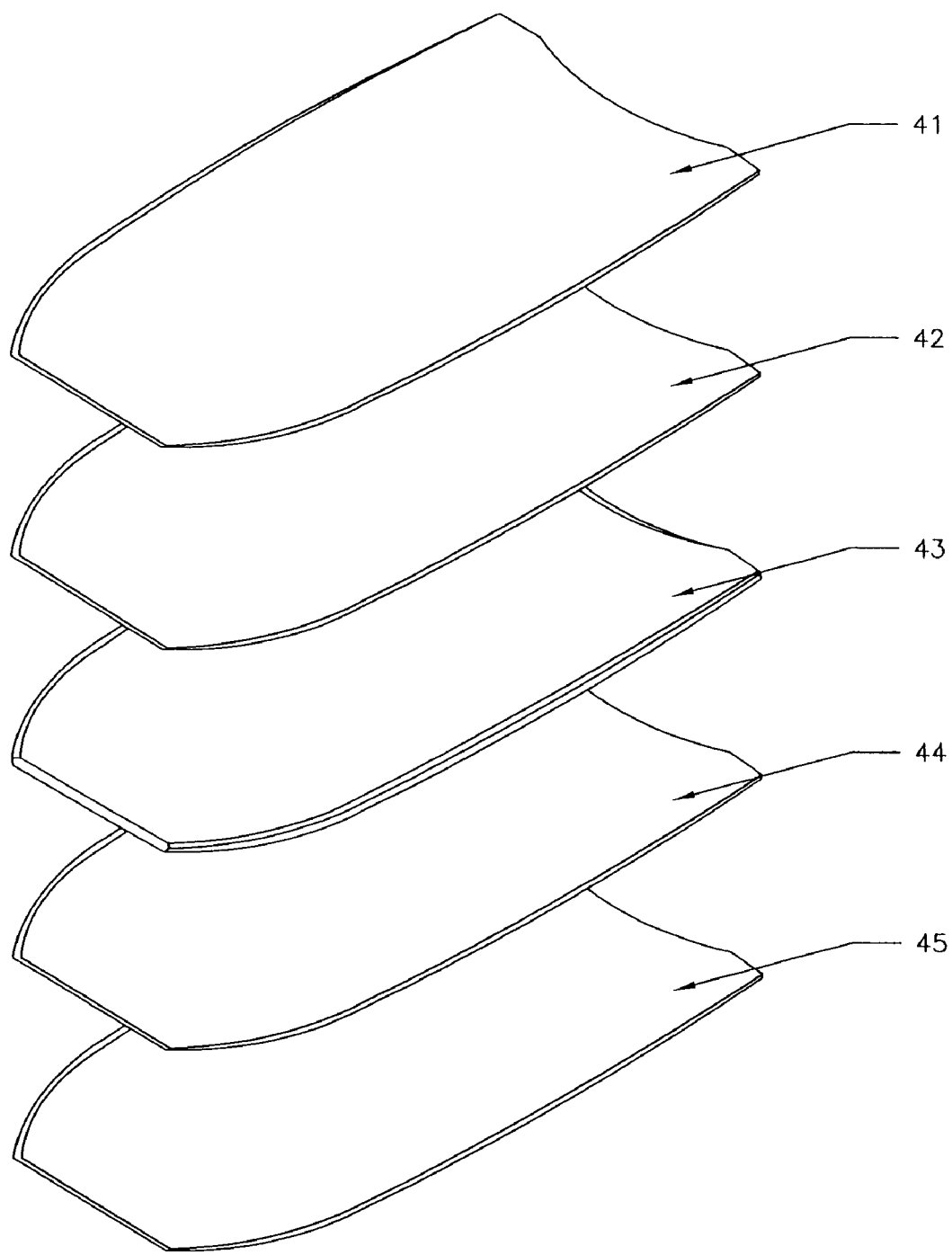
FIG. 6 is an exploded view of the sports board shown in FIG. 4.

FIGS. 4–6 show an alternate embodiment 40. In this embodiment, board 40 has five laminated layers rather than six. Intermediate layers 42 and 44 are of the same structure and composition as layers 20 and 28 in the first embodiment 15. Intermediate layer 42 facilitates a strong bond between polypropylene foam core 43 and polyethylene foam layer 41. Intermediate layer 44 facilitates a strong bond between polypropylene foam core 43 and polyethylene film layer 45.

Layer 41 is closed-cell polyethylene foam having a thickness in the range of 2 to 8 millimeters, and preferably 4.5 mm. Layer 41 has a density in the range 4 to 10 lb/ft$^3$, and preferably a density of 7 lb/ft$^3$.

Layer 42 is laminated on its outer surface to the inner surface of layer 41 and is laminated on its inner surface to the upper surface of core 43.

Core 43 is polypropylene foam having a thickness between 1 and 2.5 inches, and preferably a thickness of 2 inches. Polypropylene foam core 43 has a density of between 1.5 and 3 lb/ft$^3$, and preferably a density of 1.9 lb/ft$^3$.

Intermediate layer 44 is laminated on its inner surface to the bottom surface of core 43 and on its outer surface to the inner surface of layer 45.

Layer 45 is solid polyethylene film having a thickness between 12 and 32 mils, and a preferred thickness of 20 mils. Layer 45 has a density of between 0.942 and 0.962 g/cm$^3$, and a preferred density of 0.952 g/cm$^3$.

Body board 40 is formed in a series of steps. First, layer 43 is die cut to desired configuration. The front or nose of die-cut core 43 is then ground to form rocker 54. Layers 44 and 45 are then co-extruded to form a bottom skin, using a conventional co-extrusion process, and are cut to the desired length. The co-extruded layers 44 and 45 are then heat laminated to the bottom surface of pre-shaped core 43 using a conventional heat laminating process with rollers. Laminated layers 43, 44 and 45 are then shaped to form the desired nose 51, tail 52, and side rail 53 configurations.

Layer 42 is then extruded conventionally and heat laminated with rollers to layer 41 to produce a top laminate. The top laminate of layers 41 and 42 are then cut to the desired size. This top laminate is sized so that its outer edge will extend over the peripheral edge of core 43 enough so that it can be wrapped over, and heat laminated to, the nose 51 side edge, the tail 52 side edge and the upper portion of side rails 53 of laminated layers 44, 45 and 43. The top laminate of layers 41 and 42 are then heat laminated to the top surface of core 43. The outer portions of the top laminate are then wrapped over and laminated to the side edges of nose 51, tail 52 and the upper side surfaces of side rails 53. A polyethylene foam strip 55 is then heat laminated to cover the lower side surfaces of side rails 53 of board 40. Excess is then trimmed as necessary, completing the covering of the side surfaces of board 40.

Intermediate layers 20, 28, 42, and 44 facilitate the bonding of different polyolefin materials, including as discussed above polyethylene foam and film, polypropylene foam and polyethylene foam, and polypropylene foam and polyethylene film, using conventional thermal laminating processes. It is believed that such superior bonding is the result of the intermediate layers having a lower melt temperature than other materials, low shear viscosity, good wetting characteristics, and a linear molecular structure that diffuses quickly and forms a better physical bond with the molecules in the adjacent layers when cooled. Thus, intermediate layers 20, 28, 42, and 44 provide a superior heat laminated bond between the outer layers 23, 31 and 41, 45 and inner cores 16 and 43, respectively.

The present invention contemplates that many changes and modifications may be made. Therefore, while the presently preferred form of the sports board and an alternate embodiment has been shown and described, and certain modifications discussed, persons skilled in this art will readily appreciate that various additional changes and modifications may be made without departing from the spirit of the invention, as defined and differentiated by the following claims.

What is claimed is:

1. A sports board comprising:

an elongated expanded closed-cell polyolefin foam core having a core thickness, a core density and opposed surfaces;

a first polyolefin film layer having a thickness less than said core thickness, a density greater than said core density and an inner surface and an outer surface;

said first film layer having a density between about 0.9 and about 0.96 g/cm$^3$ and said core having a density between about 1.5 and about 4 lb/ft$^3$;

an intermediate metallocene-based polyolefin layer having an inner surface and an outer surface, a thickness less than said core thickness and a density greater than said core density;

said intermediate layer bonded on said inner surface to said core and bonded on said outer surface to said inner surface of said first layer.

2. The board set forth in claim 1, wherein said intermediate layer has a density of about 0.9 lb/ft$^3$.

* * * * *